United States Patent [19]

Kito et al.

[11] Patent Number: 4,997,164

[45] Date of Patent: Mar. 5, 1991

[54] SPARE TIRE CARRIER

[75] Inventors: Yasuo Kito, Okazaki; Katsunori Makibayashi, Toyota, both of Japan

[73] Assignee: Manno Kogyo Kabushiki Kaisha, Japan

[21] Appl. No.: 340,038

[22] Filed: Apr. 18, 1989

[30] Foreign Application Priority Data

May 19, 1988 [JP] Japan .................................. 63-122758

[51] Int. Cl.⁵ .............................................. B66D 1/06
[52] U.S. Cl. ..................................... 254/323; 414/463
[58] Field of Search ................. 414/463; 254/323, 342, 254/375; 224/42.12

[56] References Cited

U.S. PATENT DOCUMENTS

| | | | |
|---|---|---|---|
| 3,874,536 | 4/1975 | Watanake | 414/463 |
| 4,059,197 | 11/1977 | Iida | 414/463 |
| 4,535,973 | 8/1985 | Dorr | 254/323 |
| 4,544,136 | 10/1985 | Denman | 254/323 |
| 4,625,947 | 12/1986 | Ivan | 254/323 |
| 4,693,453 | 9/1987 | Denman | 254/323 |

FOREIGN PATENT DOCUMENTS

| | | |
|---|---|---|
| 41-10330 | 5/1966 | Japan . |
| 43-16343 | 7/1968 | Japan . |
| 497640 | 4/1974 | Japan . |
| 49-19439 | 5/1974 | Japan . |
| 63-53183 | 3/1988 | Japan . |

Primary Examiner—Katherine Matecki
Attorney, Agent, or Firm—Oliff & Berridge

[57] ABSTRACT

A spare tire carrier utilizing a differential gear mechanism having a wire wheel rotatably held in a housing, for winding a wire rope to lift a spare tire. The differential gear mechanism includes an internal gear coaxial and integral with the wire wheel, a drive gear meshing with the internal gear, and a drive gear plate coaxial and integral with the drive gear and adapted to come into abutment with the housing to prevent the drive gear from rotating in a wire rope unwinding direction. The drive gear is rotatably fitted on an eccentric portion of the drive shaft. The housing and the drive gear plate are provided with a stopper mechanism for stopping an eccentric motion of the drive gear plate when the drive gear plate rotates in a wire rope winding direction from its position of abutment with the housing.

12 Claims, 7 Drawing Sheets

SPARE TIRE CARRIER

BACKGROUND OF THE INVENTION

1. Field of the Invention

The present invention relates to a spare tire carrier of a motor vehicle and more particularly to improvements in a spare tire carrier of the type wherein a spare tire is lifted through the utilization of a wire rope.

2. Description of the Prior Art

Some of the conventional spare tire carriers of this type utilize a differential gear mechanism in order to reduce the winding force.

The different ail gear mechanism of this type is, in general, constructed such that when a lifted spare tire is to be lowered, a handle is turned manually or by power to reversely rotate a wire wheel which has wound up a wire rope, and thereby unwind the wire rope.

One problem with such a construction is that, in lowering the spare tire, a worker, being unaware of the completion of the unwinding of the wire rope, further turns the handle to drive the wire wheel and thereby winds the wire rope, which has been completely unwound, in the reverse direction.

To deal with this problem there has been proposed, for example, such a construction as described in Japanese Patent Laid-Open No. 53183/1988 wherein there is provided a slide stopper provided at a gateway of a wire rope in a housing movable along the path of movement of the wire rope at the gateway during winding and unwinding of the wire rope, the slide stopper having a through-hole through which the wire rope is windingly and unwindingly extended, and there is also provided a cutout formed on the outer periphery of a wire wheel and engageable with the slide stopper in a direction of unwinding when unwinding of the wire rope by the wire wheel is completed.

However, such a spare tire carrier involves the problem that when the slide stopper slides while being guided by a guide provided in the housing, it sometimes comes into mesh with the guide so that it does not slide up to the position of its engagement with the cutout on the wire wheel.

Another problem is that the slide stopper and the guide groove of the housing are apt to wear out due to sliding friction between the two and the manufacturing cost is increased.

SUMMARY OF THE INVENTION

It is therefore the primary object of the invention to provide a spare tire carrier capable of preventing over-rotation of the wire wheel when unwinding of the wire rope by the wire wheel is completed, thereby preventing reverse winding of the wire rope, without using the slide stopper or a guide mechanism for the slide stopper.

To achieve the above described object, the present invention contemplates a spare tire carrier including a housing; a drive shaft rotatably mounted in the housing; a wire wheel held in the housing rotatably by the drive shaft for winding and unwinding a wire rope which suspends a spare tire; an internal gear coaxial and integral with the wire wheel; a drive gear meshing with the internal gear; and a drive gear plate coaxial and integral with the drive gear and adapted to come into abutment with the housing to prevent the drive gear from rotating in a wire rope unwinding direction, the drive gear being rotatably fitted on an eccentric portion of the drive shaft, the housing and the drive gear plate being provided with a stopper mechanism for stopping an eccentric motion of the drive gear plate when the drive gear plate rotates in a wire rope winding direction from its position of abutment with the housing.

To achieve the above described object, the present invention also contemplates that the drive gear plate is provided with a control arm extending outwardly beyond the outer periphery of the drive gear and adapted to come into abutment with the housing to prevent the drive gear plate from rotating in the wire rope unwinding direction. And the stopper mechanism comprises a cutout formed on a side end face in the wire rope winding direction of the control arm and an engaging projection formed on the housing in proximity to the cutout and spaced from the control arm and face in the wire rope winding direction.

To achieve the above described object, the present invention also contemplates that the drive gear plate is provided with a control arm extending outwardly beyond the outer periphery of the drive gear and adapted to come into abutment with the housing to prevent the drive gear plate from rotating in the wire rope unwinding direction. Further, the stopper mechanism comprises a stopper arm extending outwards beyond the outer periphery of the drive gear on the side opposite to the control arm of the drive gear plate and adapted to come into abutment with the housing when the control arm moves away from the housing to prevent the drive gear plate from rotating in the wire rope winding direction, and a housing-side engaging projection formed on the housing slightly spaced from the tip end of the stopper arm in the wire rope unwinding direction.

To achieve the above described object, the present invention further contemplates that there is used a spring for urging the drive gear plate in the wire rope unwinding direction.

To achieve the above described object, the present invention additionally contemplates that the mounting end portion of the wire rope for the wire wheel is made rockable in a rotating plane of the wire wheel.

According to the present invention, when unwinding of the wire rope is completed and the wire wheel starts reverse winding of the wire rope, the drive gear plate undergoes a rotational force acting in a direction opposite to the normal direction. This effect is utilized in the present invention. More particularly, an eccentric motion of the drive gear plate which tries to perform the same motion is prevented by the stopper mechanism to thereby prevent the wire wheel from reversely rotating.

BRIEF DESCRIPTION OF THE DRAWINGS

Embodiment of the present invention will hereunder be described with reference to the accompanying drawings, in which.

DETAILED DESCRIPTION OF THE PREFERRED EMBODIMENTS

As shown in FIGS. 1 through 5, a spare tire carrier, indicated at 10, according to a first embodiment of the invention includes a housing 12, a drive shaft 14 rotatably mounted in the housing 12, a wire wheel 20 held in the housing 12 rotatably by the drive shaft 14 for winding and unwinding a wire rope 18 which suspends a spare tire 16, an internal gear 22 coaxial and integral with the wire wheel 20, a drive gear 24 meshing with the internal gear 22, and a drive gear plate 26 coaxial and integral with the drive gear 24 and adapted to come into abutment with a bottom 12A of the housing 12 to prevent the drive gear 24 from rotating in a wire rope unwinding direction, the drive gear 24 being rotatably fitted on an eccentric portion 14A of the drive shaft 14, and the housing 12 and the drive gear plate 26 being provided with a stopper mechanism 28 for preventing an eccentric motion of the drive gear plate 26 when the drive gear plate 26 rotates in a wire rope winding direction from the position of its abutment with the bottom 12A of the housing 12.

The housing 12 is generally U-shaped in its vertical section parallel to the drive shaft 14 and it has a pair of opposed side walls 12B and 12C inter-connected through the bottom 12A. Between the side walls 12B and 12C are disposed the wire wheel 20, internal gear 22, drive gear 24 and drive gear plate 26.

The drive shaft 14 is rotatably mounted in the housing 12 by being inserted through mounting holes 13A and 13B formed in the side walls 12B and 12C, respectively.

The drive gear plate 26 is provided with a control arm 27 extending outwardly beyond the outer periphery of the drive gear 24 and adapted to come into abutment with the bottom 12A of the housing 12 to prevent the drive gear plate 26 from rotating in the wire rope unwinding direction.

Figure 1:
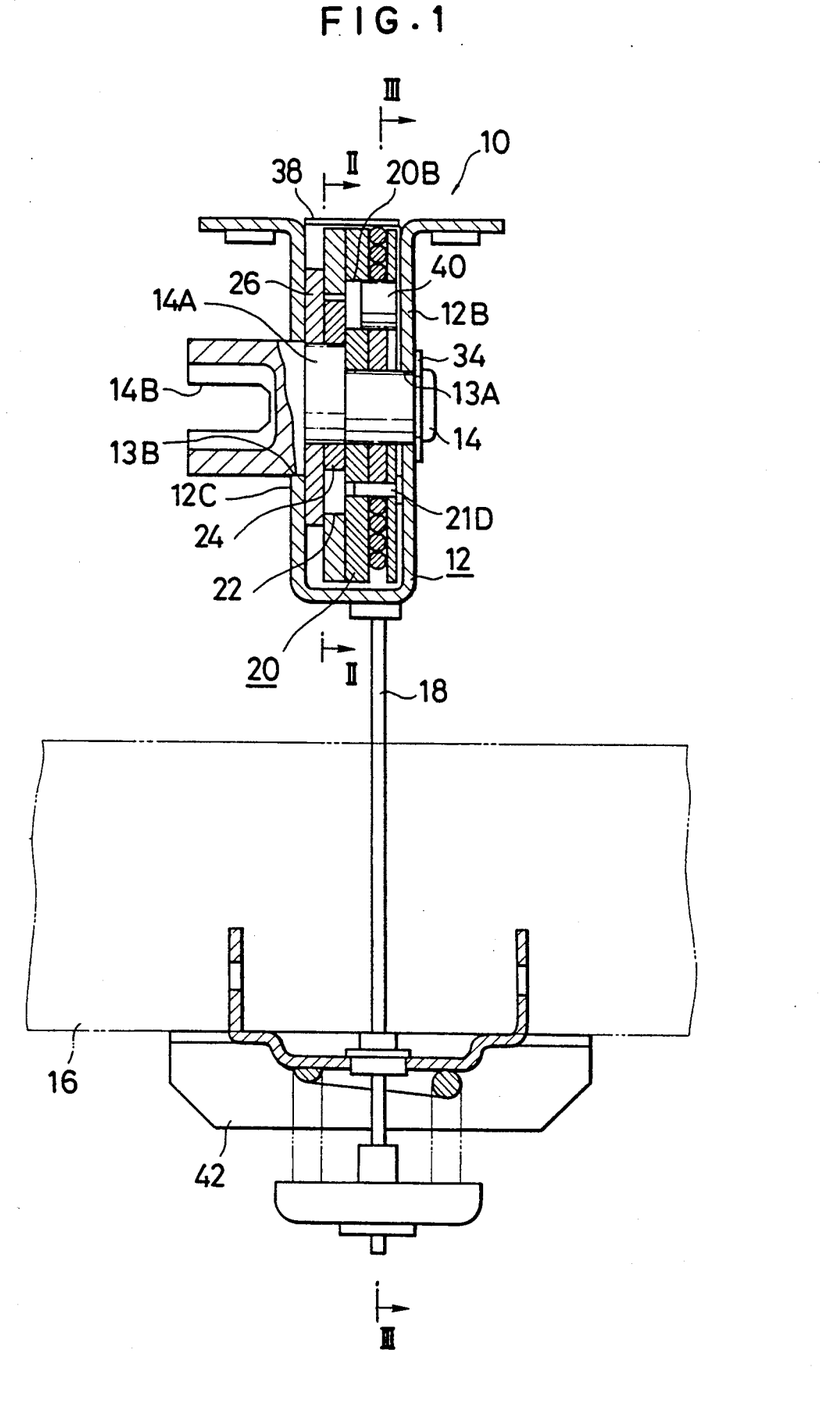
FIG. 1 is a sectional view of a spare tire carrier according to an embodiment of the present invention.
Figure 2:
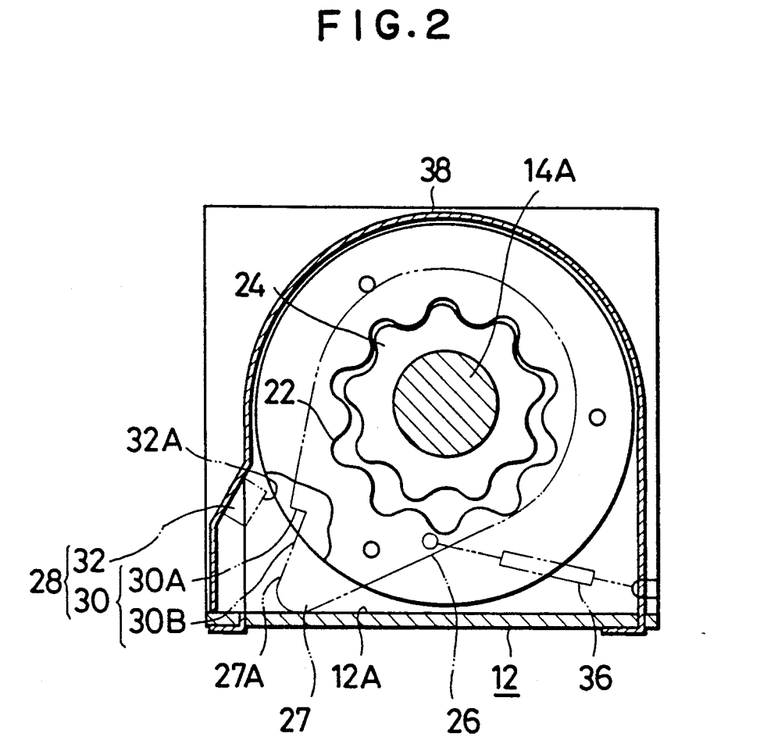
FIGS. 2 and 3 are sectional views taken along lines II—II and III—III in FIG. 1.
Figure 3:
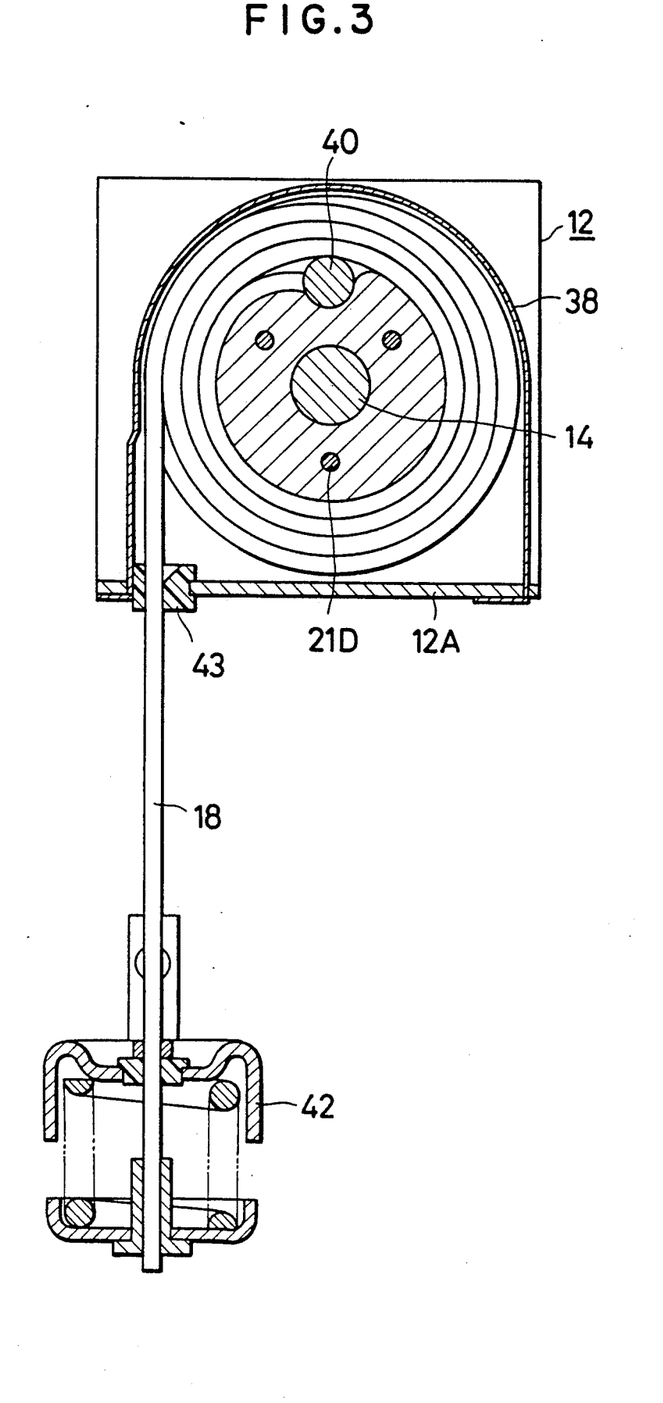
Figure 4:
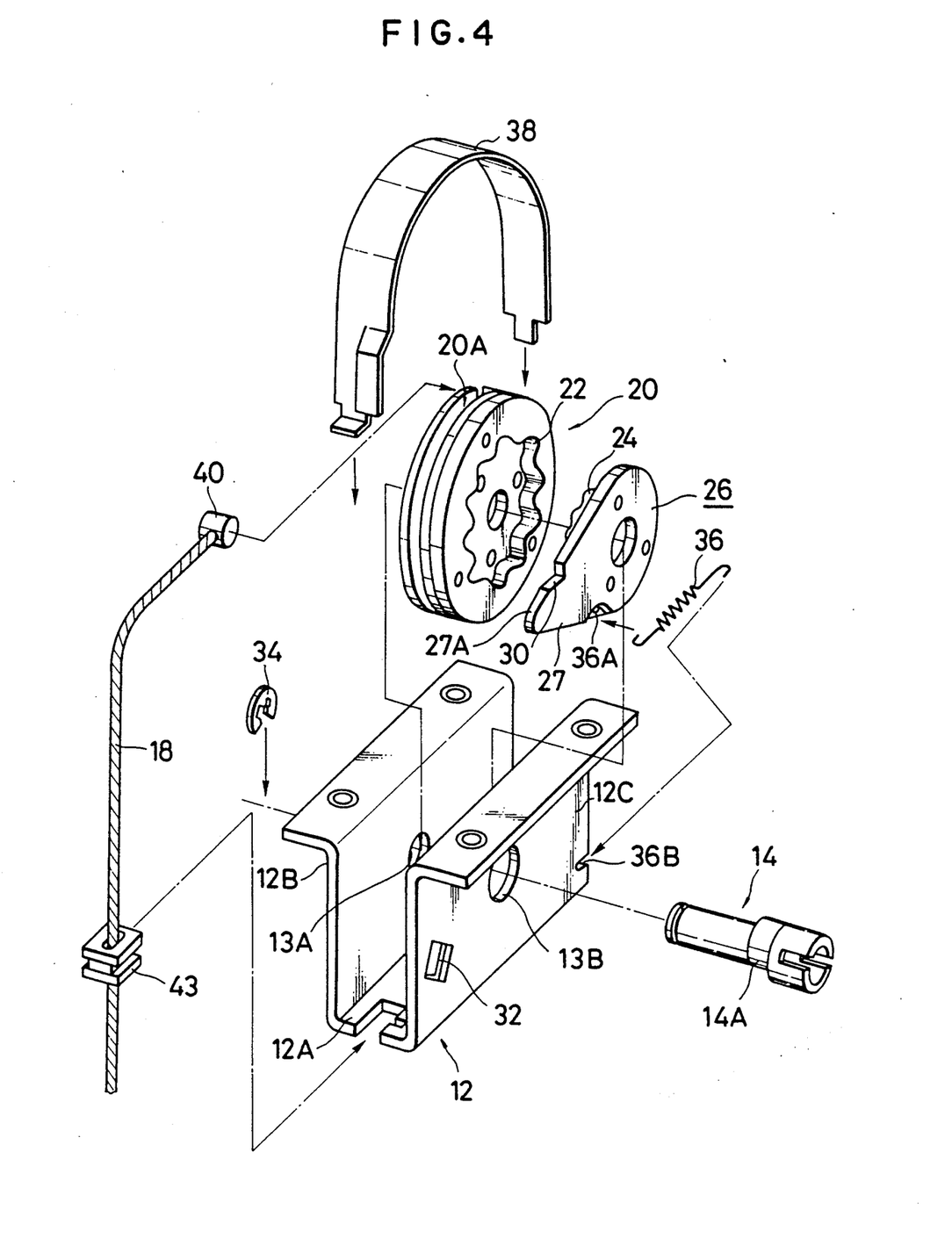
FIG. 4 is an exploded perspective view of said embodiment.

The stopper mechanism 28 comprises a cutout 30 formed on a side and face in the wire rope winding direction of the control arm 27, namely, on an upper-side end face 27A in FIGS. 2 and 4, and an engaging projection 32 formed on the side wall 12C extending toward side wall 12B of the housing 12 in proximity to the cutout 30 and spaced from the upper-side end face 27A of the control arm 27 in the wire rope winding direction (above in the figure).

The drive gear plate 26 performs an eccentric motion about the axis of the drive shaft 14 at a radius which corresponds to the amount of eccentricity of the eccentric portion 14A of the drive shaft 14, and at the same time the tip end of the control arm 27 slides in contact with the bottom 12A of the housing 12.

The cutout 30 comprises an engaging end face 30A cut in the upper-side end face 27A so as to approximately perpendicularly intersect the moving path toward the tip end of the control arm 27 in the eccentric motion of the drive gear plate 26, and an inclined face 30B inclined from an end portion of the engaging end face 30A toward the tip end of the control arm 27.

The engaging projection 32 is formed projectingly on the inside of the side wall 12C of the housing 12 and it has an engaging end face 32A.

The drive shaft 14 is formed at one end thereof with a cutout 14B with which a winding handle, not shown, is engageable. Further, an E washer 34 is fitted on an end portion of the drive shaft 14 protruding from the side wall 12B on the side opposite to the cutout 14B to lock the drive shaft 14 against dislodgement.

Numeral 36 denotes a spring stretched between a retaining hole 36A formed in the drive gear plate 26 and a retaining cutout 36B formed in the housing 12, for urging the drive gear plate 26 in a direction in which its control arm 27 comes into abutment with the bottom 12A, namely, in the counterclockwise direction in FIG. 2. Numeral 38 denotes a guide plate for guiding the wire rope 18 into a winding groove 20A of the wire wheel 20.

A columnar fixture 40 is attached to the wire wheel-side end portion of the wire rope 18. The fixture 40 is fitted in a mounting hole 20B formed in the wire wheel 20 so that it is rockable in a plane parallel to the rotational plane of the wire wheel 20.

To the end of the wire rope 18 is attached an anchor plate 42 for resting the spare tire 16 thereon. Further, a guide bush 43, through which the wire rope 18 is inserted, is attached to the bottom 12A of the housing 12.

Figure 5:
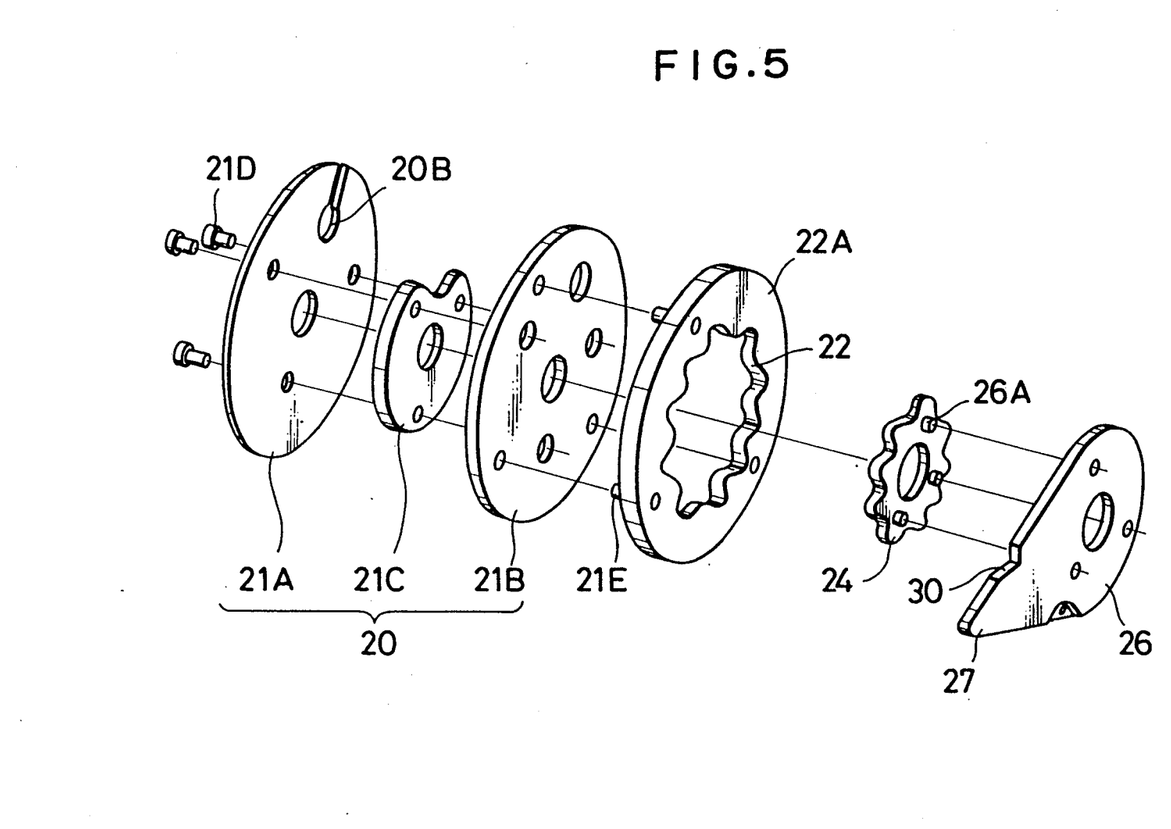
FIG. 5 is an exploded perspective view showing a wire wheel, a drive gear and a drive gear plate in said embodiment.

The wire wheel 20, as shown in FIGS. 4 and 5, comprises a pair of large-diameter plates 21A and 21B and a small-diameter plate 21C therebetween. These three plates are coupled together using plural pins 21D to form the winding groove 20A along the outer periphery of the small-diameter plate 21C.

Further, a gear plate 22A formed with the internal gear 22 is integrally attached to the wire wheel 20 using pins 21E.

The drive gear 24 is integrally connected to a drive gear plate 26 using pins 26A.

The drive shaft 14 is rotatably driven by the winding handle, whereby the eccentric shaft portion 14A revolves around the rotational axis of the drive shaft 14.

The drive gear 24 rotatably fitted on the eccentric shaft portion 14A tries to rotate by an angle determined by the difference in teeth between the internal gear 22 and the drive gear 24 for each revolution of the eccentric shaft portion 14A.

Figure 6A:
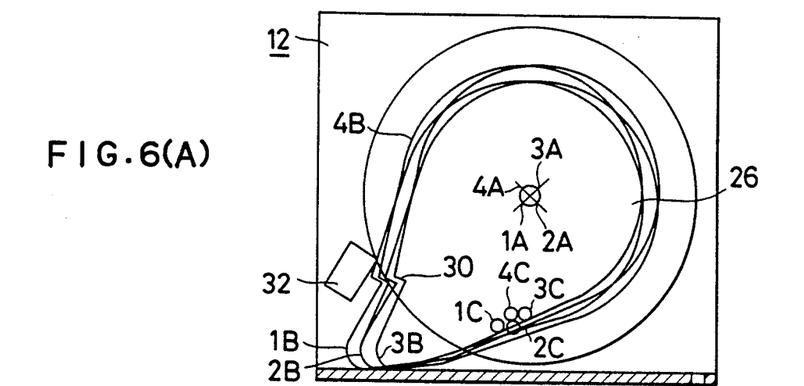
FIGS. 6(A), 6(B), and 6(C) are schematic sectional views showing the operation of the drive gear plate and that of a stopper mechanism.

At this time, the control arm 27 of the drive gear plate 26 abuts the bottom 12A of the housing 12 in the unwinding direction (counterclockwise direction in FIG. 2) of the wire rope 18 and so cannot be turned. Consequently, the wire wheel 20 is turned by an angle corresponding to the rotational angle of the drive gear 24. Further, at this time, the drive gear 24 and the drive gear plate 26 perform only an eccentric rocking motion around the axis of the drive shaft 14 at a radius corresponding to the amount of eccentricity of the eccentric shaft portion 14A. The reference numerals 1A to 4A in FIGS. 6(A) and 6(C) represent four points spaced at 90° intervals on the path of eccentric motion of the center of the eccentric shaft portion 14A. The reference numerals 1B to 4B and 1C to 4C represent states and positions corresponding to the four points 1A to 4A of the drive gear plate 26 and the retaining hole 36A.

In this way the wire wheel 20 winds the wire rope 18 at a reduced speed and with an increased torque.

Also at the time of unwinding the wire rope 18 to lower the spare tire 16, the wire wheel 20 is decelerated in its rotation, allowing the wire rope 18 to be delivered gradually from the winding groove 20A.

Irrespective of the direction in which the drive shaft 14 is driven rotatably, the drive gear plate 26 always undergoes a force in a direction in which the control arm 27 comes into abutment with the bottom 12A. This is because the wire wheel 20 is pulled in the counterclockwise direction in FIG. 6 by the wire rope 18 and the load of the anchor plate 42 and that of the spare tire 16 applied to the wire rope 18, in addition to the urging force of the spring 36.

Figure 6B:
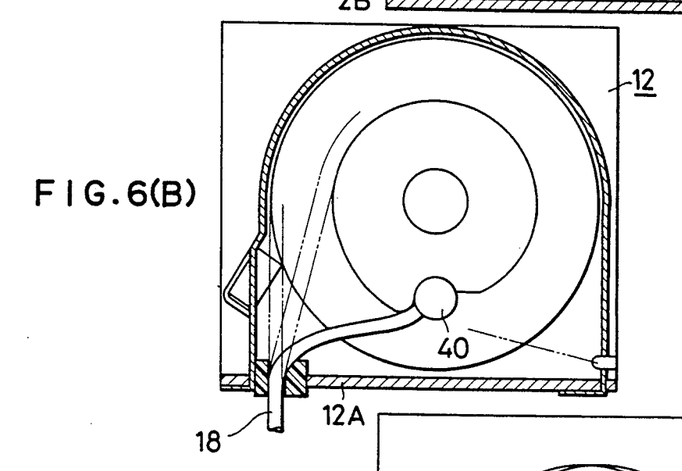
Figure 6C:
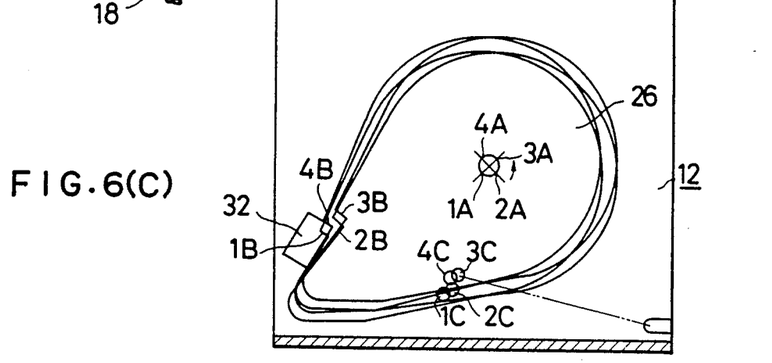

After completion of the unwinding of the wire rope 18, if the drive shaft 14 is overturned in the unwinding direction of the rope, as shown in FIG. 6(B), the loads of the wire rope 18, anchor plate 42 and spare tire 16 act in the direction opposite to the normal direction, that is, in a direction (clockwise direction in FIG. 6) in which the control arm 27 of the drive gear plate 26 moves away from the bottom 12A.

Consequently, the drive gear plate 26 performs an eccentric motion about the axis of the drive shaft 14 while shifting in the direction in which the control arm 27 moves away from the bottom 12A, as shown in FIG. 6(C).

The control arm 27 moves away from the bottom 12A and its upper end face 27A abuts the engaging projection 32, whereby the rocking motion of the drive gear plate 26 in the direction leaving the bottom 12A is prevented. In this state, due to overturn of the drive shaft 14, the control arm 27 performs an eccentric rocking motion in sliding contact with the engaging projection 32.

During this eccentric rocking motion, when the control arm 27 returns in the direction of its tip end, the engaging end face 30A of the cutout 30 abuts the engaging end face 32A of the engaging projection 32 to prevent the control arm 27 from moving toward its tip end.

That is, the eccentric motion of the drive gear plate 26 and that of the drive gear 24 are blocked in the state indicated by the reference numerals 4A, 4B and 4C in FIG. 6(C), thereby making the drive shaft 14 unrotatable. Consequently, a reverse winding of the wire rope by the wire wheel 20 is prevented.

In this way the stopper mechanism 28 operates and the cutout 30 and the engaging projection 32 come into engagement with each other. In this state, if the drive shaft 14 is driven in the winding direction of the wire rope 18, a torque acting in the unwinding direction of the wire rope 18 is imposed on the wire wheel 20 due to the loads of the wire rope 18, spare tire 16 and anchor plate 42.

At the same time, the drive gear plate 26 starts its eccentric rocking motion in the direction in which the cutout 30 moves away from the engaging projection 32.

Consequently, the control arm 27 can be easily disengaged from the engaging projection 32 and perform its eccentric rocking motion in the winding direction of the wire rope 18.

In this connection, since the columnar fixture 40 is attached to the wire wheel-side end portion of the wire rope 18 and it is fitted in the mounting hole 20B of the wire wheel 20 so as to be rockable in the rotational plane of the wheel, an excessive force will not act on the wheel-side end portion of the wire rope 18 even when reverse winding is started after completion of unwinding of the wire rope 18.

Although in the above embodiment the stopper mechanism 28 is composed of the cutout 30 of the control arm 27 and the engaging projection 32 formed on the side wall 12C of the housing 12, the present invention is not limited to this construction. Any other construction may be adopted if only it can prevent the eccentric rocking motion of the drive gear plate 26 when the wire wheel 20 starts winding.

Figure 7:
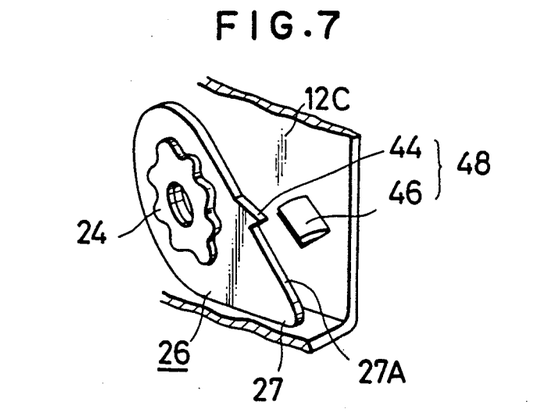
FIG. 7 is a perspective view showing a stopper mechanism in a second embodiment of the present invention.

For example, as in the second embodiment of the invention shown in FIG. 7, a stopper mechanism 48 may be constituted by an engaging projection 44 formed on the side of the drive gear plate 26 and an engaging projection 46 formed on the side of the housing 12 in an opposed relation to the projection 44.

Figure 8:
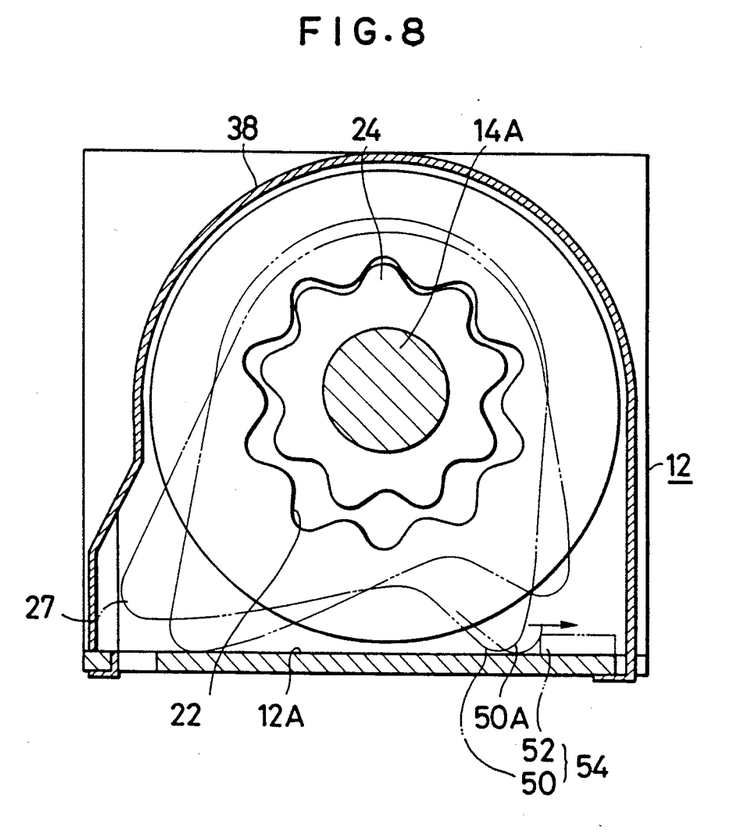
FIG. 8 is a sectional view showing a third embodiment of the present invention.

Further, as in the third embodiment shown in FIG. 8, a stopper mechanism 54 may be constituted by a stopper arm 50 extending outwardly beyond the outer periphery of the drive gear 24 on the side opposite to the control arm 27 of the drive gear plate 26 and adapted to come into abutment with the bottom 12A of the housing 12 when the control arm 27 moves away from the housing 12, to prevent the drive gear plate 26 from rotating in the wire rope winding direction, and an engaging projection 52 formed on the bottom 12A slightly spaced from a tip end 50A of the stopper arm 50 in the wire rope unwinding direction.

Although in the above embodiments the spring 36 is used to urge the drive gear plate 26 in the direction in which the control arm 27 of the drive gear plate 26 abuts the bottom 12A, it is not always necessary to use such a spring because in the present invention the drive gear plate 26 is prevented from rotating in the wire rope winding direction by the stopper mechanism 28 or 48, provided the provision of the spring 36 is advantageous in that the control arm 27 can be brought into abutment with the bottom 12A stably and that therefore the wire wheel 20 can be driven for rotation smoothly.

Further, although in the above embodiments the winding groove 20A of the wire wheel 20 is formed so as to wind the wire rope 18 in the shape of a vortex, the present invention is not limited to this. The wire wheel 20 may be constructed so that it can wind the wire rope 18 in the form of a coil in the axial direction of the wheel.

Moreover, although in the above embodiments the control arm 27 of the drive gear plate 26 abuts the bottom 12A of the housing 12 to block rotation in the wire rope unwinding direction, the control arm 27 may be brought into abutment with the housing 12 at any other part than the bottom 12A, for example, by forming a projection on the housing 12.

What is claimed is:

1. A spare tire carrier including:
a housing;
a drive shaft rotatably mounted in said housing, said drive shaft having an eccentric portion;
a wire wheel rotatably held in said housing by said drive shaft for winding an unwinding a wire rope for suspending a spare tire;
an internal gear coaxial and integral with said wire wheel;
a drive gear meshing with said internal gear; and
a drive gear plate coaxial and integral with said drive gear and means on the drive gear plate for abutting with said housing to prevent said drive gear plate from rotating in a wire rope unwinding direction;
said drive gear being rotatably fitted on the eccentric portion of said drive shaft;
said housing and said drive gear plate being provided with interengaging stopper portions for stopping an eccentric motion of said drive gear plate when the drive gear plate rotates in a wire rope winding direction for its position of abutment with said housing.

2. A spare tire carrier as set forth in claim 1, wherein:
said drive gear plate is provided with a control arm extending outwardly beyond an outer periphery of said drive gear and adapted to come into abutment with said housing to prevent said drive gear plate from rotating in the wire rope unwinding direction; and
said drive gear plate stopper portion comprises a cutout formed on a side end face of said control arm in the wire rope winding direction, and said housing stopper portion comprises an engaging projection formed on said housing in proximity to said cutout and spaced from said control arm end face in the wire rope winding direction.

3. A spare tire carrier as set forth in claim 2, further comprising a spring for urging said drive gear plate in the wire rope unwinding direction.

4. A spare tire carrier as set forth in claim 3, wherein a mounting end portion of the wire rope for said wire wheel is rockable in a rotating plane of said wire wheel.

5. A spare tire carrier as set forth in claim 2, wherein a mounting end portion of the wire rope for said wire wheel is rockable in a rotating plane of said wire wheel.

6. A spare tire carrier as set forth in claim 1, wherein:
said drive gear plate is provided with a control arm extending outwardly beyond an outer periphery of said drive gear and adapted to come into abutment with said housing to prevent said drive gear plate from rotating in the wire rope unwinding direction; and
said drive gear plate stopper portion comprises a stopper arm extending outwardly beyond the outer periphery of said drive gear on a side opposite to said control arm of said drive gear plate and adapted to come into abutment with said housing when said control arm moves away from said housing to prevent said drive gear plate from rotating in the wire rope winding direction, and said housing stopper portion comprises an engaging projection formed on said housing slightly spaced from a tip end stopper arm in the wire rope unwinding direction.

7. A spare tire carrier as set forth in claim 3, further comprising a spring for urging said drive gear plate in the wire rope unwinding direction.

8. A spare tire carrier as set forth in claim 7, wherein a mounting end portion of the wire rope for said wire wheel is rockable in a rotating plane of said wire wheel.

9. A spare tire carrier as set forth in claim 6, wherein a mounting end portion of the wire rope for said wire wheel is rockable in a rotating plane of said wire wheel.

10. A spare tire carrier as set forth in claim 1, further comprising a spring for urging said drive gear plate in the wire rope unwinding direction.

11. A spare tire carrier as set forth in claim 10, wherein a mounting end portion of the wire rope for said wire wheel is rockable in a rotating plane of said wire wheel.

12. A spare tire carrier as set forth in claim 1, wherein a mounting end portion of the wire rope for said wire wheel is rockable in a rotating plane of said wire wheel.

* * * * *